United States Patent [19]

So

[11] Patent Number: 5,729,347
[45] Date of Patent: Mar. 17, 1998

[54] OPTICAL WAVELENGTH MEASUREMENT SYSTEM

[76] Inventor: Vincent So, 529 Chapel Street, Ottawa, Ontario, Canada, K1N 8A1

[21] Appl. No.: 744,420

[22] Filed: Nov. 8, 1996

[51] Int. Cl.⁶ ............................................... G01J 3/26
[52] U.S. Cl. .................................. 356/416; 356/419
[58] Field of Search ........................... 356/416, 419; 372/32

[56] References Cited

U.S. PATENT DOCUMENTS

| | | |
|---|---|---|
| 4,998,256 | 3/1991 | Ohshima et al. ............... 372/32 |
| 5,287,367 | 2/1994 | Yanagawa ................... 372/32 X |
| 5,450,207 | 9/1995 | Fomenkov .................. 356/416 |
| 5,627,648 | 5/1997 | Garrett .................... 356/419 X |

FOREIGN PATENT DOCUMENTS

| | | | |
|---|---|---|---|
| 60-73342 | 4/1985 | Japan | 356/416 |
| 60-85339 | 5/1985 | Japan | 356/416 |
| 2269230 | 2/1994 | United Kingdom . | |

*Primary Examiner*—Vincent P. McGraw
*Attorney, Agent, or Firm*—Litman, McMahon & Brown, L.L.C.

[57] ABSTRACT

A wavelength measurement system is provided which allows the very accurate measurement of wavelengths in a relatively small predetermined range. A transmission ratio is formed consisting of the power of an optical signal which has passed through a thin-film interference filter divided by the power of a control signal. A table look up is performed in a stored transmission ratio wavelength table. The system is also used in a self stabilizing laser, and a spectrometer.

3 Claims, 8 Drawing Sheets

OPTICAL WAVELENGTH MEASUREMENT SYSTEM

FIELD OF THE INVENTION

The invention relates to an optical wavelength measurement system.

BACKGROUND OF THE INVENTION

In many optical systems, a method for measuring the wavelength of an optical signal is required. In some applications, sub-angstrom measurement resolution and accuracy are not required. For these applications filters have been designed with coloured glass filters which are capable of measuring wavelength to an accuracy of about 1 nm over a wide range of wavelength.

An existing commercial system which provides a relatively coarse wavelength measurement is the Wave Mate Wavelength Meter manufactured by ILX Lightwave. In this system, light is passed through a filter such as a red glass filter which has a monotonic and decreasing transmission characteristic with increasing wavelength in the range of 500 nm to 1000 nm. A first sensor senses the signal strength of the optical signal which has passed through the filter, and a second sensor senses the signal strength of the unfiltered signal. A wavelength dependent ratio is formed, and used to look up the wavelength in a stored table. Due to the change in transmission ratio being spread over a relatively large wavelength range, the accuracy of this system is inherently limited, since there is a practical limit to the accuracy of the relative signal strength measurement.

UK Patent Application GB 2269230 published Feb. 2, 1994 by S. V. C. Ramm discloses a similar wavelength measuring system.

In some applications, the accuracy of the coloured glass filter systems is not sufficient. In these cases, traditionally, an elaborate grating based optical spectrum analyzer such as the HP71451A Optical Spectrum Analyzer manufactured by Hewlett Packard is used as a tunable filter to separate different wavelengths of light. In order for such spectrum analyzers to provide 0.01 nm or better accuracy, a long optical path is required tending to limit the compactness and ruggedness of the device. As such, these devices are not very practical for performing field measurements.

Some existing fibre optic communications systems employ multi-wavelength fibre transmission systems which use a broadband EDFA (Erbium doped fibre amplifier) operating in the 1550 nm wavelength region (1525 nm to 1575 nm). Channel spacing on such fibres may be as close as 1 nm in the 1550 nm region requiring the wavelength of a transmitter to be stabilized accurately within a 1 nm bandwidth. A cost effective field instrument to measure the wavelength to that accuracy is crucial to support such a multi-wavelength system. The grating based wavelength meter described above is too bulky and expensive, while the coloured glass filter type described above cannot provide the required accuracy.

SUMMARY OF THE INVENTION

It is an object of the invention to provide a wavelength measurement system which obviates or mitigates the above disadvantages.

According to a first broad aspect, the invention provides an optical wavelength measurement system for measuring wavelengths in a predetermined wavelength range near a predetermined centre wavelength, the system comprising: coupling means for receiving an incoming optical signal and splitting it into a measurement signal and a control signal; a thin film interference filter having a transition region of wavelengths including said predetermined range, the thin film interference filter being situated such that the measurement signal must pass through the filter so as to produce a filtered signal, the thin film filter having in the transition region a steep transmission ratio vs. wavelength characteristic; first detector means for producing a first value proportional to the power of the control signal; second detector means for producing a second value proportional to the power of the filtered signal; and processing means for computing a transmission ratio consisting of the second value divided by the first value and for computing a measured wavelength as a function of the transmission ratio.

According to a second broad aspect, the invention provides an optical wavelength measurement system for measuring wavelengths in a plurality N where N≧2 of predetermined wavelength ranges each having a respective predetermined centre wavelength, the system comprising: coupling means for receiving an incoming optical signal and splitting it into N measurement signals and a control signal; N thin film interference filters each having a transition region of wavelengths including a respective one of said predetermined ranges, each thin film interference filter being situated such that a respective one of the measurement signals must pass through the filter so as to produce a respective filtered signal, each thin film filter having in its respective transition region a steep transmission ration vs. wavelength characteristic; first detector means for producing a first value proportional to the power of the control signal; a detector means associated with each interference filter for producing a respective value proportional to the respective filtered signal; processing means for determining which of the interference filters is producing a valid value, for computing a transmission ratio consisting of the valid value divided by the first value and for computing a measured wavelength as a function of the transmission ratio.

According to a third broad aspect, the invention provides a self-correcting laser package for inserting an optical signal having a accurate wavelength into a transmission medium, the package comprising: a laser having two facets, one of the facets for producing an first optical signal for insertion into the transmission medium, the other of the facets for producing a second optical signal to be input to a wavelength measurement system; the optical wavelength measurement system being for measuring wavelengths in a predetermined wavelength range near a predetermined centre wavelength, the wavelength measurement system producing a wavelength measurement for the second optical signal; wavelength adjustment means having a target wavelength set therein for adjusting the wavelength of the signals generated by the laser as a function of the measured wavelength and the target wavelength.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Figure 1:
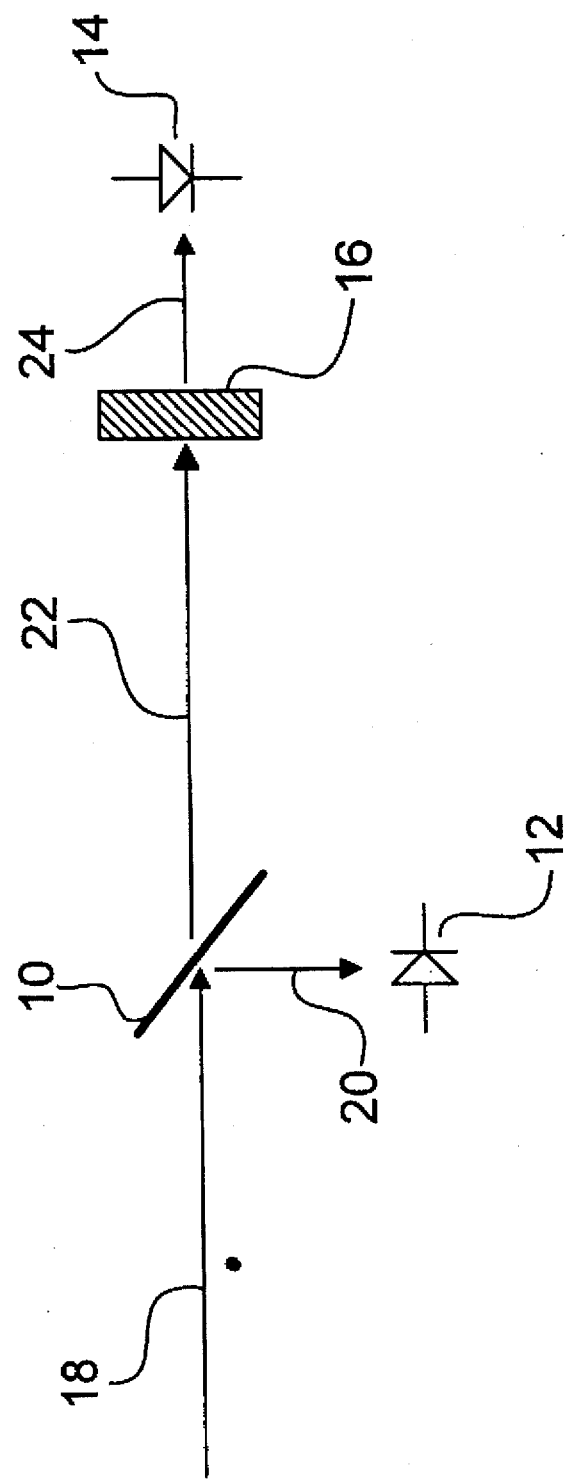
FIG. 1 is a schematic of a conventional wavelength measurement system.

Referring firstly to FIG. 1 which is a schematic of a conventional wavelength measurement system, the system consists of an optical coupler 10, two photodetectors 12,14, and a coloured glass filter 16 in a path between the optical coupler 10 and one of the photodetectors 14. An incoming optical signal 18 is split into two separate but identical optical signals by the optical coupler 10, namely a control signal 20 and a measurement signal 22. The power in each signal 20,22 is half the power in the incoming optical signal 18. Signals 18,20,22 are carried by optical fibres or some other type of waveguide (not shown).

The control signal 20 propagates directly to the first photodetector 12. The photodetector 12 produces a first photocurrent having a strength proportional to the power of the control signal 22 incident upon it.

The measurement signal 22 propagates through the coloured glass filter 16 producing a filtered signal 24 which then propagates to the second photodetector 14. The second photodetector produces a second photocurrent having a strength proportional to the power in the filtered signal 24. Some of the energy in the measurement signal 22 is absorbed or reflected by the coloured glass filter 16 resulting in the second photocurrent being different from the first photocurrent. A transmission ratio is formed consisting of the second photocurrent value divided by the first photocurrent value. This transmission ratio is a function of wavelength, and depends upon the transmission characteristics of the coloured glass filter 16.

Figure 2:
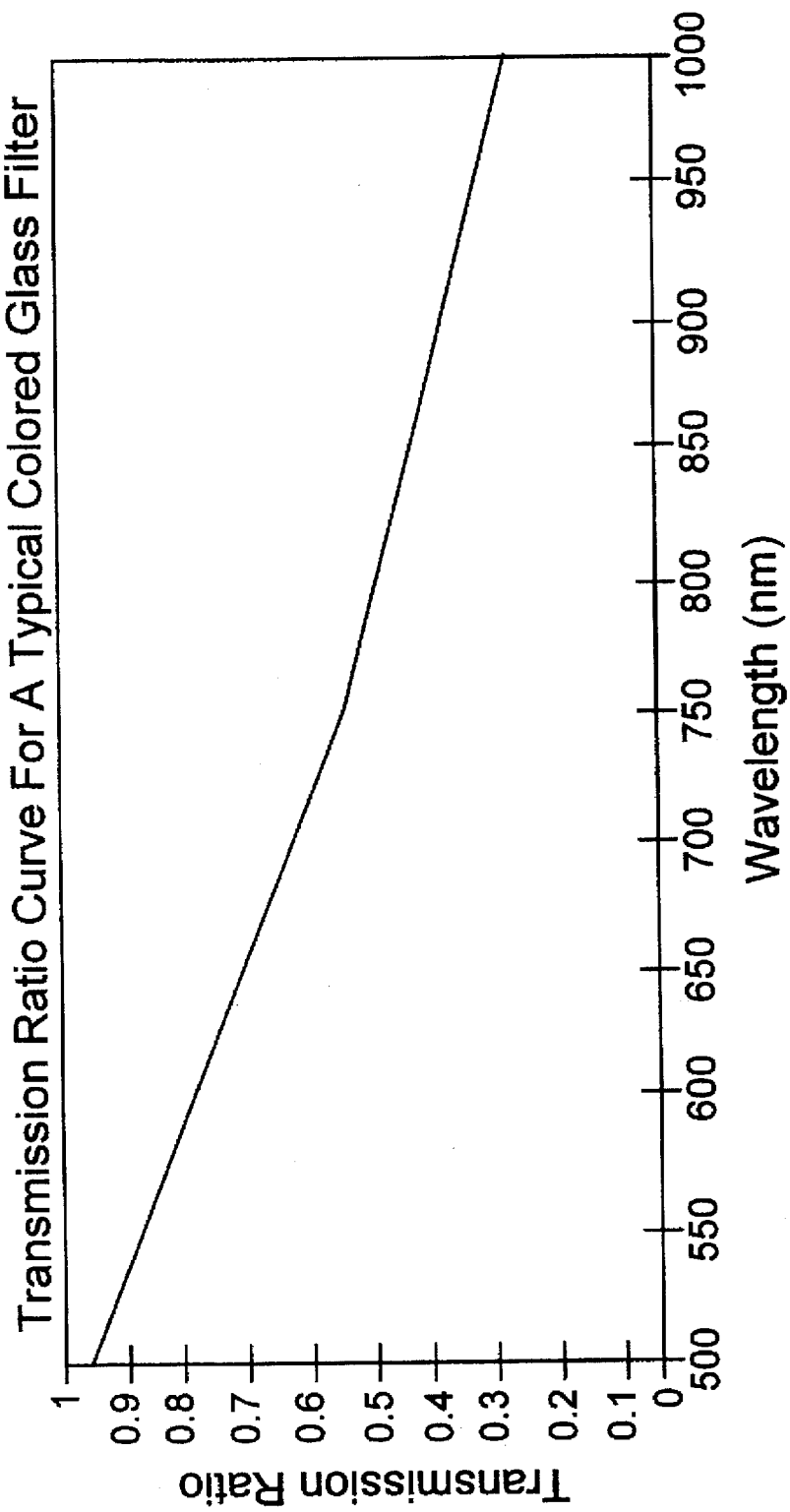
FIG. 2 is a plot of the transmission ratio for a typical coloured glass filter used in the wavelength measurement system of FIG. 1.

A plot of a transmission ratio curve for a typical coloured glass filter is shown in FIG. 2 for wavelengths in the range of 500 nm to 1000 nm. The transmission ratio varies from about 0.96 down to about 0.3 in this range. Data such as that plotted in FIG. 2 is stored in a calibration look up table for each coloured glass filter 16. The measurement of the wavelength of the incoming light signal 18 is completed by looking up the transmission ratio in the calibration table to determine the corresponding wavelength. The accuracy of this system is limited by the accuracy of the measurement of the power of the optical signals 20,24 by the photodetectors 12,14. This limits the accuracy of the transmission ratio to about 0.001. Since approximately a 0.66 range of transmission ratio is spread across a 500 nm range of wavelength, a +/−0.001 uncertainty in the transmission ratio results in a +/−0.76 nm uncertainty in the wavelength measurement. This is not precise enough for fibre optic communications applications.

Figure 3:
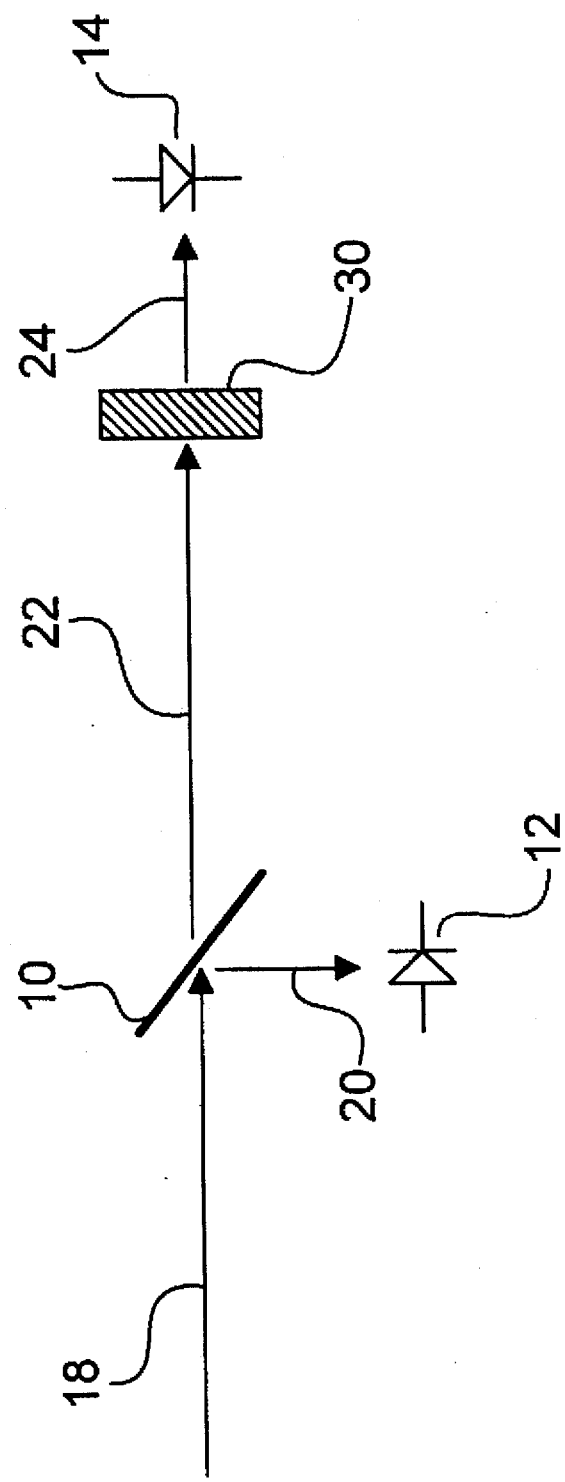
FIG. 3 is a thin film filter based wavelength measurement system according to the invention.

Referring now to FIG. 3, a schematic of a wavelength measurement system according to the invention is shown in which the components which are common with those of FIG. 1 have been similarly labelled. The coloured glass filter 24 of FIG. 1 has been replaced with a thin film interference filter 30.

Figure 4:
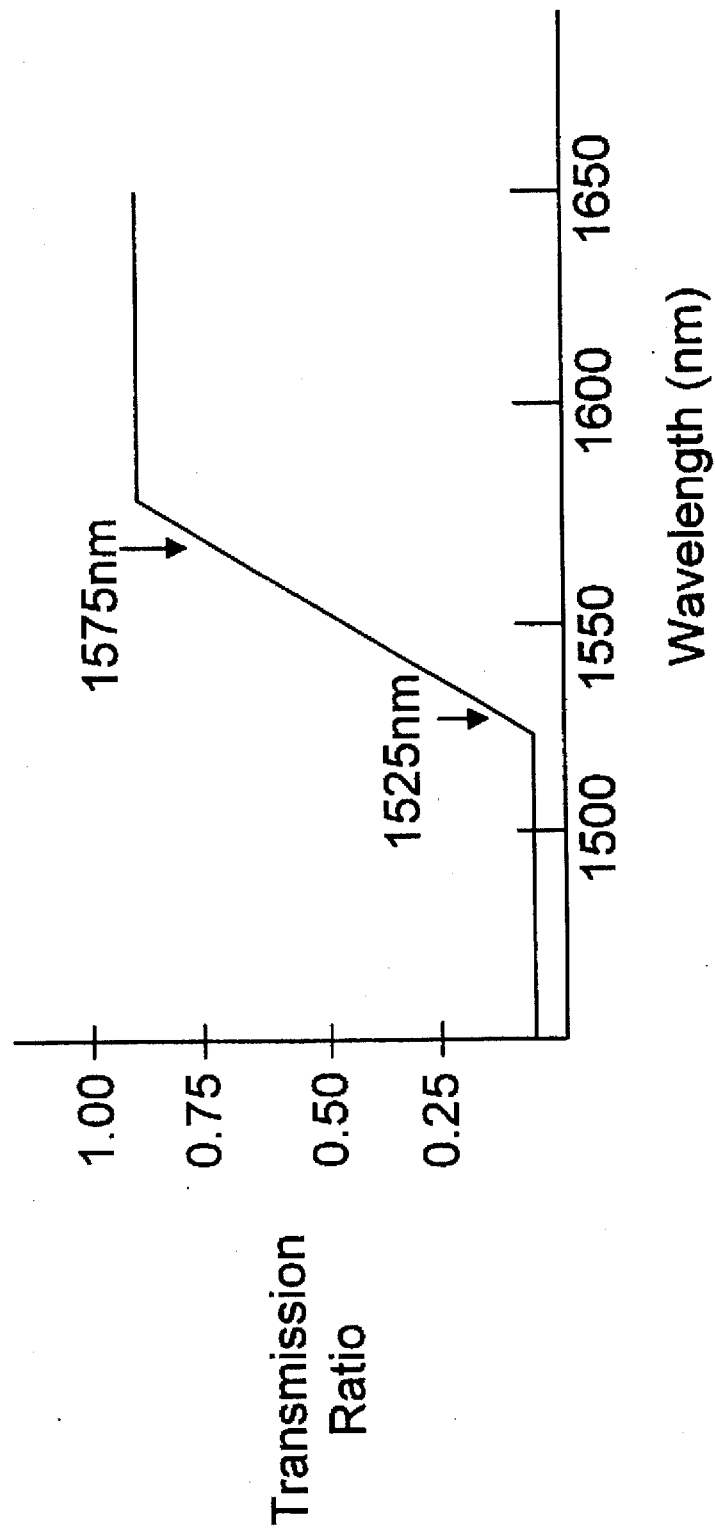
FIG. 4 is a plot of the transmission ratio for an exemplary thin film interference filter used in the wavelength measurement system of FIG. 3.

A plot of a transmission ratio curve for an exemplary thin film interference filter is shown in FIG. 4 for a thin film filter having a passband above 1575 nm and a stopband below 1525 nm. Conventional applications for this type of filter do not involve the measurement of an optical wavelength, and are instead concerned with the ability of this filter to block out wavelengths in the stopband, and pass wavelengths in the passband. In the instant application however, it is the transition region from 1525 nm to 1575 nm which is of interest. For the particular transmission ratio characteristic plotted in FIG. 4, the transmission ratio varies from about 0.05 up to about 0.9 in the transition region range of wavelength. As in the conventional systems, data such as that plotted in FIG. 4 is stored in a calibration look up table for each thin film interference filter 26. The calibration table would typically be stored in a memory (not shown), and several tables might be stored for a variety of thin film filters which might be installed. The measurement of the wavelength of the incoming light signal 18 is completed by looking up the transmission ratio in the calibration table to determine the corresponding wavelength. It is to be understood that depending upon the density of the values stored in the calibration table, an interpolation function may need to be performed if the transmission ratio measured falls between two of the values stored in the table. The accuracy of this system is limited by the accuracy of the measurement of the optical signals 20,24 by the photodetectors 12,14. This limits the accuracy of the transmission ratio to about 0.001. Since approximately a 0.85 range of transmission ratio is spread across a 50 nm range of wavelength, a +/−0.001 uncertainty in the transmission ratio results in a +/−0.06 nm. This is sufficiently precise for fibre optic communications applications.

A thin film interference filter is a multi-layer thin film device having a wavelength dependent transmission characteristic. There are two basic types of thin film interference filters, namely bandpass filters and edge filters. Edge filters transmit only above an edge or cutoff wavelength while bandpass filters transmit within a range of wavelengths. In either case, they are designable to have a steep transition in transmission characteristic from completely blocking an optical signal to almost completely passing the optical signal. Thin film filters consist of a layered series of thin films which have indices of refraction which alternate between high and low. The layers each have a thickness which is a multiple of one quarter of the wavelength of the desired wavelength at the centre of the transition region. The spacing between the layers is chosen so that the beams produced by the multiple reflections from the layers are in phase with the transmitted beam for the desired wavelength thus enhancing the transmittance of the filter at that wavelength. Other wavelengths are rejected because these multiple beams destructively interfere with each other. By varying the thickness of the layers and the number of layers, a wide variety of passband and transition region characteristics can be made.

Edge filters consist of layers having quarter wave thicknesses and layers having modified thicknesses. These are characterized by a transition region with a very steep slope.

In the instant application, the filter is designed to have a transition region centred around the wavelength of interest.

Figure 5:
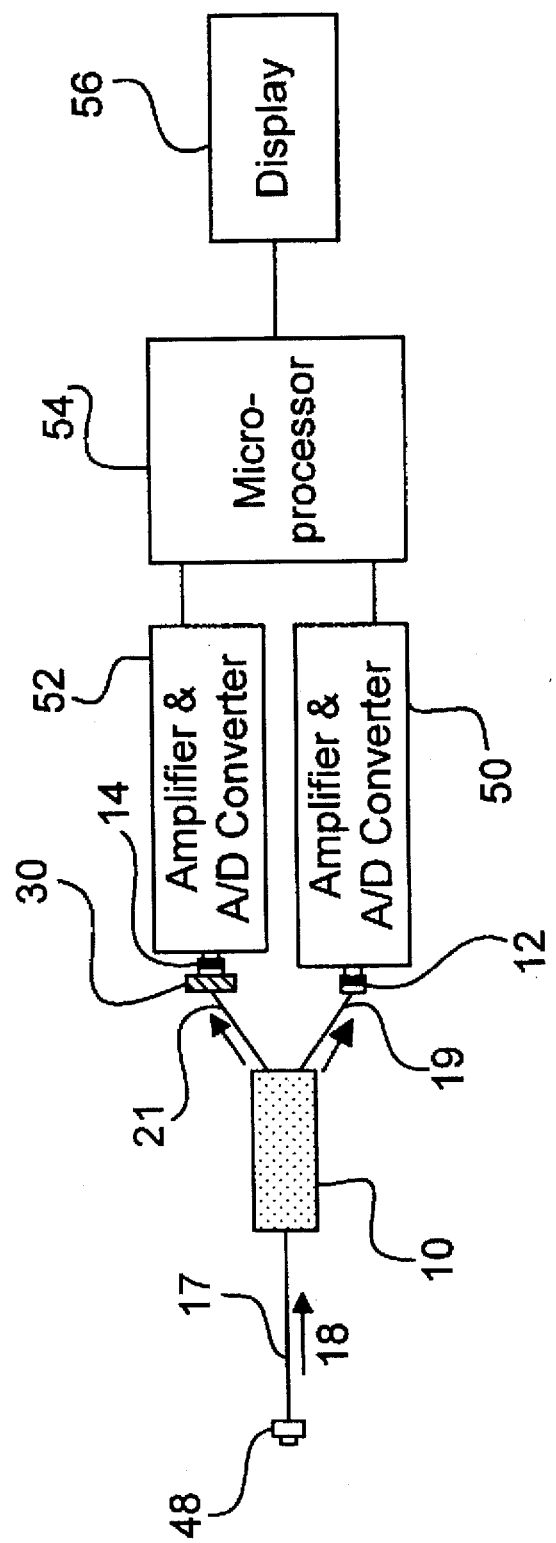
FIG. 5 is a schematic of the thin film filter based wavelength measurement system of FIG. 3 including additional components to compute and display a measured wavelength.

FIG. 5 depicts the wavelength measurement system of FIG. 3 in which optical fibres for carrying the various signals are shown and in which additional components are introduced for computing and displaying the measured wavelength. In addition to the fibre optic coupler 10, the thin film interference filter 30, and the two photodetectors 12, 14, there is an optical connector 48 for connecting an optical fibre 17 to a source of the incoming signal 18. Two optical fibres 19,21 connect the optical coupler 10 to the photodetector 12 and the thin film filter 30 respectively, and carry optical signals 20, 22 respectively. Two amplifier & A/D converter blocks 50,52 are connected to receive the photocurrent produced by the photodetectors 12, 14 respectively. A microprocessor 54 is connected to receive an output from each of the amplifier & A/D converter blocks 50,52, and a display 56.

In use, the two photocurrents produced by the photodetectors 12, 14 are amplified and converted to two digital signals by the amplifier and A/D converter blocks 50,52. The two digital signals are passed to the microprocessor 54 which divides them to produce the transmission ratio. The microprocessor 54 looks up the transmission ratio in a table stored in memory in order to determine the corresponding wavelength. This value is then displayed on the display 56.

Figure 6:
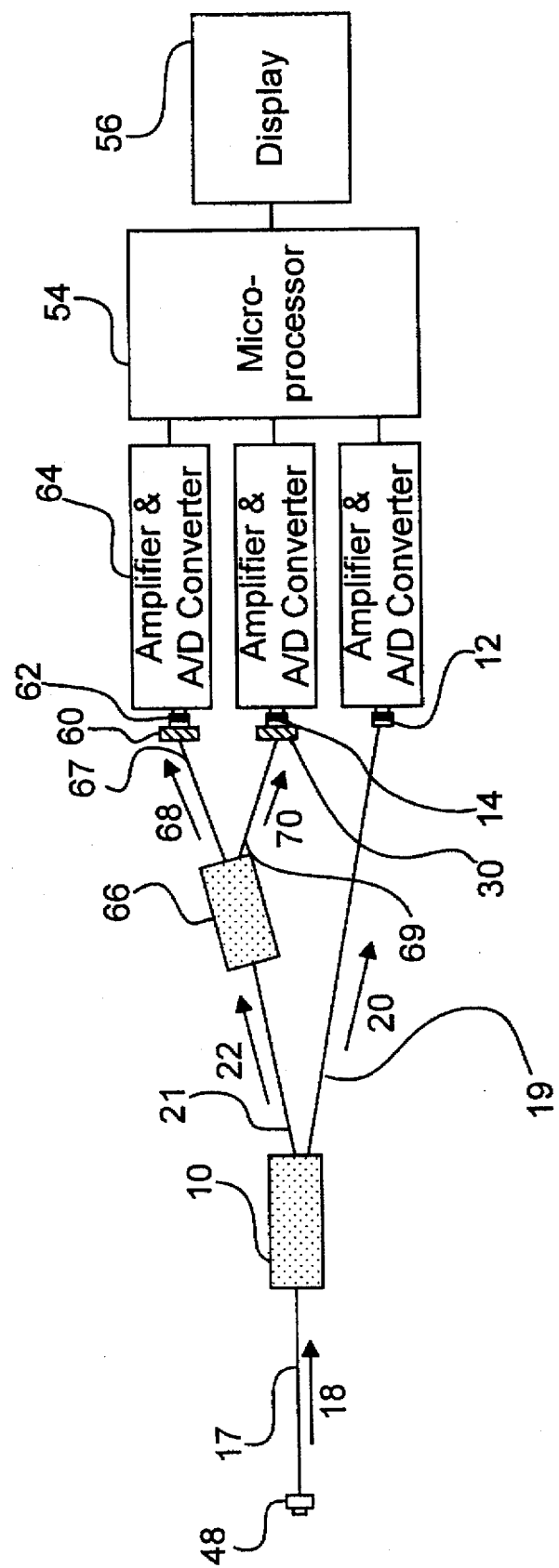
FIG. 6 is a schematic of another thin film interference filter based wavelength measurement system according to the invention.

Referring now to FIG. 6, a thin film interference filter based wavelength measurement system according to the invention is shown which is equipped to measure accurately wavelengths in two different wavelength regions. Elements which are common with FIG. 5 have been identically labelled. This embodiment features an additional thin film filter interference filter 60, photodetector 62, and amplifier & A/D converter block 64. An additional optical coupler 66 is provided to split the measurement signal 22 into two measurement signals 68,70 on two separates fibres 67,69 for propagation through the two thin film filters 30,60. In this case, a quarter of the total power that is in the incoming signal 18 arrives at each thin film filter 30,60, and half of the total power is in the control signal measured by the remaining detector 12. Preferably, the two thin film filters 30,60 are designed to be centred around the wavelengths 1310 nm and 1550 nm respectively.

In use, an incoming optical signal 18 will arrive at the three photodetectors 12,14,62 and produce three different photocurrents. The respective amplifier and A/D converter blocks 50,52,64 converts each of these to a digital value. The three values are then passed to the microprocessor 54. The microprocessor 54 analyzes the two digital values received from the amplifier & A/D converter blocks associated with thin film filters 30,60 to determine which digital value to use. For each thin film filter 30,60 there is an acceptable range of transmission ratio values. If a given value received is not in the transition region of the respective thin film filter, then the microprocessor does not use that value, instead using the other value. If neither value is within the range of the respective transition band, then an indication is provided to the user on the display 56 that the wavelength is outside the applicable range. It may also indicate that it is above or below a certain value. If a given digital value does fall within the transition region of the respective thin film filter 30 or 60 then that value is selected as the correct value to use. Once the correct digital value to use has been determined, a transmission ratio is computed by dividing the correct digital value by the digital value produced by the amplifier & A/D circuit associated with the control signal and multiplying by two, since the power of the signal input to the thin film filters 30,60 is one half that input to the control photodetector as a result of the additional optical coupler 66. Once again, the microprocessor 54 looks up the computed transmission ratio in a table stored in memory for the respective thin film filter 30 or 60, and outputs to the display 56 the corresponding wavelength. In this case, the memory must have stored in it two different transmission to wavelength characteristics.

Figure 7:
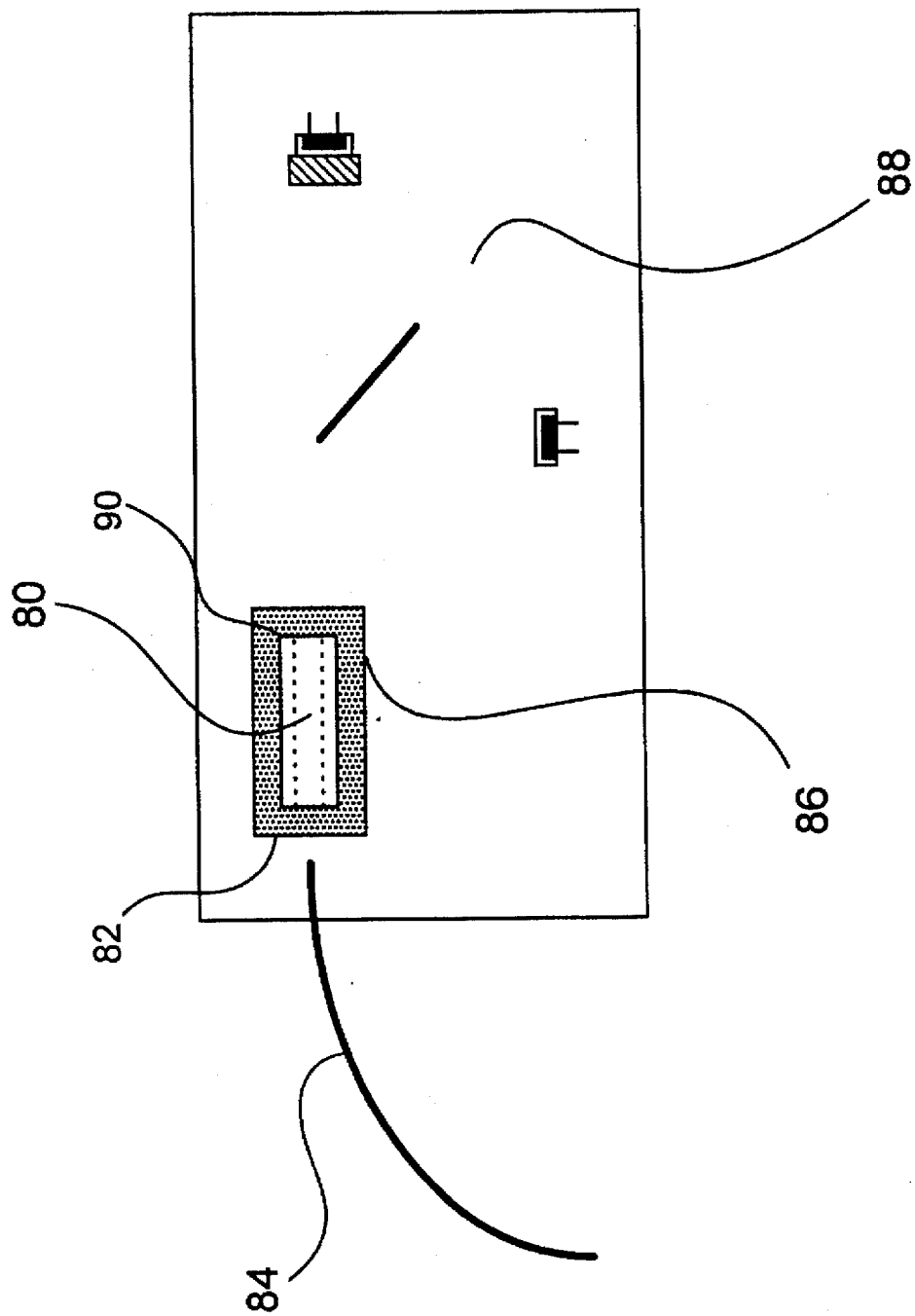
FIG. 7 is a schematic of a packaged laser with a thin film filter wavelength measurement stabilizer according to the invention.

Another embodiment of the invention is shown schematically in FIG. 7 in which a laser and a wavelength measurement system are combined together in a package. It is common at the input of an optical fibre to use lasers which emit light both from a front facet and from a back facet. In the embodiment illustrated, a laser 80 is shown having a front facet 82 coupled into an optical fibre 84. A cooler 86 is installed around the laser 80 to control the temperature of the laser. A wavelength measurement system 88 according to the invention such as that illustrated in FIG. 3 is situated to receive light emitted from a back facet 90 of the laser as the incoming signal 18. The incoming signal is processed by the wavelength measurement system 88 as before to produce a measurement of wavelength. A desired or target wavelength is programmed into the wavelength measurement system. When the measured wavelength deviates from the target wavelength, the wavelength of the laser 80 is automatically adjusted by controlling the temperature of the laser. In a variant of this embodiment, rather than using the cooler 86 to control the output of the laser 80 as a function of the measured wavelength deviation, the wavelength of the laser can be adjusted automatically by controlling a laser tuning voltage.

Figure 8:
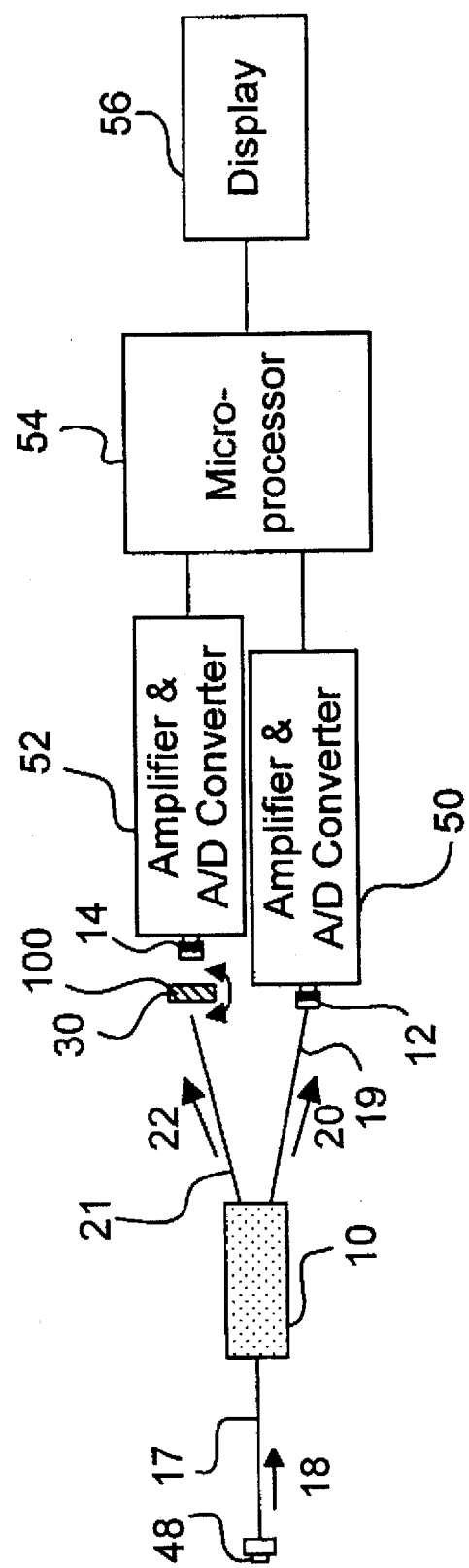
FIG. 8 is a schematic of a thin film interference filter based spectrometer according to the invention.

Another embodiment of the invention is shown schematically in FIG. 8 in which a thin film filter is used in the construction of a spectrometer. The components illustrated are similar to those in FIG. 5, and are similarly labelled. In this embodiment, the thin film interference filter 30 is mounted on a rotational stage 100 which can rotate the filter through at least a 30° range.

The thin film filter 30 is rotated by the rotational stage 100 such that it is progressively tilted at an increasing angle to the incident light of the measurement signal 22 instead of always being perpendicular to the incident light of the measurement signal 22 as in the previously described embodiments. When the thin film filter 30 is tilted on an angle, the effective location of the transition region shifts to a shorter wavelength, the wavelength at the centre of the transition region increasing as the tilt angle increases.

In use, the thin film filter 30 is rotated through its 30° range, and while it is rotating, the transmission ratio readings are continuously (or periodically) recorded in a table in memory. After a complete rotation of the thin film filter 30 a table of the transmission ratio as a function of the angle of the thin film filter 30 is completely filled in. This table is equivalent to a convolution of the spectrum of the incoming optical signal 18 with the response of the thin film interference filter 30. The spectrum of the incoming signal is then computed by microprocessor 54, for example by deconvolving the spectrum with a known thin film interference filter response also stored in memory. This system permits the measurement of a very accurate frequency response over the wavelength range of the thin film filter.

It is noted that with bandpass filters, a bandwidth/ steepness of transition region trade-off exists. The wider the bandwidth, the less steep is the transition region. For this reason, edge filters are preferred for the wavelength measurement embodiments. For the spectrum analyzer embodiment a narrow bandpass filter is preferred. If a very narrow bandpass is used which has a response which approximates a delta function, then no deconvolution is required to recover the spectrum of the incoming signal.

Numerous modifications and variations of the present invention are possible in light of the above teachings. It is therefore to be understood that within the scope of the appended claims, the invention may be practiced otherwise than as specifically described herein.

The embodiments of the invention in which an exclusive property or privilege is claimed are defined as follows:

1. An optical wavelength measurement system for measuring wavelengths in a predetermined wavelength range near a predetermined centre wavelength, the system comprising:

coupling means for receiving an incoming optical signal and splitting it into a measurement signal and a control signal;

a thin film interference filter having a transition region of wavelengths including said predetermined range, the thin film interference filter being situated such that the measurement signal must pass through the filter so as to produce a filtered signal, the thin film filter having in the transition region a steep transmission ratio vs. wavelength characteristic;

first detector means for producing a first value proportional to the power of the control signal; second detector means for producing a second value proportional to the power of the filtered signal;

processing means for computing a transmission ratio consisting of the second value divided by the first value and for computing a measured wavelength as a function of the transmission ratio;

a mechanism for rotating the optical filter, through at least a 30° range of angles such that the optical filter is progressively tilted at an increasing angle to the incident measurement signal;

memory means for storing a transmission ratio table as a function of the angle of that optical filter through its entire range and for storing a known frequency response table of the thin film filter; and computation means for computing a spectrum of the incoming signal.

2. A system according to claim 1 wherein the computation means computes the spectrum by deconvolving the transmission ratio table with the stored known frequency response.

3. A system according to claim 1 wherein the thin film filter is a narrow bandpass filter.

* * * * *